(12) United States Patent
Imamura et al.

(10) Patent No.: US 12,241,907 B2
(45) Date of Patent: Mar. 4, 2025

(54) CHIP AND FLUID-MERGING METHOD

(71) Applicant: SEKISUI CHEMICAL CO., LTD., Osaka (JP)

(72) Inventors: Kazuhiko Imamura, Osaka (JP); Tsutomu Nakamura, Osaka (JP); Nobuhiko Inui, Saitama (JP); Ryousuke Takahashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 762 days.

(21) Appl. No.: 17/601,621

(22) PCT Filed: Apr. 20, 2020

(86) PCT No.: PCT/JP2020/017036
§ 371 (c)(1),
(2) Date: Oct. 5, 2021

(87) PCT Pub. No.: WO2020/218234
PCT Pub. Date: Oct. 29, 2020

(65) Prior Publication Data
US 2022/0196693 A1 Jun. 23, 2022

(30) Foreign Application Priority Data
Apr. 22, 2019 (JP) .................... 2019-080930

(51) Int. Cl.
*B01L 3/00* (2006.01)
*G01N 35/08* (2006.01)
*G01N 35/00* (2006.01)

(52) U.S. Cl.
CPC ........ *G01N 35/08* (2013.01); *B01L 3/502715* (2013.01); *B01L 3/502746* (2013.01);
(Continued)

(58) Field of Classification Search
CPC ............. G01N 35/08; G01N 37/00; B01L 3/502715; B01L 3/502746; B01L 2200/0684;
(Continued)

(56) References Cited

U.S. PATENT DOCUMENTS 6,296,020 B1   10/2001   McNeely et al.
6,591,852 B1    7/2003   McNeely et al.
(Continued)

FOREIGN PATENT DOCUMENTS

JP    2002-527250    8/2002
JP    2004-163104    6/2004
(Continued)

OTHER PUBLICATIONS

International Search Report (ISR) issued Jun. 23, 2020 in International (PCT) Application No. PCT/JP2020/017036.
International Preliminary Report on Patentability issued Sep. 28, 2021 in International (PCT) Application No. PCT/JP2020/017036.

*Primary Examiner* — Christine T Mui
(74) *Attorney, Agent, or Firm* — Wenderoth, Lind & Ponack, L.L.P.

(57) ABSTRACT

A chip that does not require high-accuracy discharge amount control for a liquid delivery pump and can suppress entrainment of air bubbles, including: a first flow path; a second flow path; a merging portion provided on a downstream end portion side of the first flow path and merge the first fluid and the second fluid; a first connection flow path connecting the first flow path and the second flow path at the merging portion and have a liquid delivery resistance higher than the first flow path; a degassing flow path connecting to the second flow path on a downstream side of the first connection flow path; a third flow path provided on a downstream side of the merging portion; and a second connection flow
(Continued)

path connecting the first flow path and the third flow path and have a liquid delivery resistance higher than the first flow path.

11 Claims, 9 Drawing Sheets

(52) U.S. Cl.
CPC ............... *B01L 2200/0684* (2013.01); *B01L 2300/0816* (2013.01); *B01L 2400/08* (2013.01)

(58) Field of Classification Search
CPC ......... B01L 2300/0816; B01L 2400/08; B01L 2300/088; B01L 2400/084
USPC .................................................. 422/504, 500
See application file for complete search history.

(56) References Cited

U.S. PATENT DOCUMENTS

| | | |
|---|---|---|
| 6,637,463 B1 | 10/2003 | Lei et al. |
| 2002/0036018 A1 | 3/2002 | McNeely et al. |
| 2003/0077204 A1 | 4/2003 | Seki et al. |
| 2009/0155927 A1 | 6/2009 | Higashino et al. |
| 2016/0160208 A1 | 6/2016 | Santiago et al. |
| 2018/0237767 A1 | 8/2018 | Santiago et al. |
| 2019/0078077 A1 | 3/2019 | Santiago et al. |

FOREIGN PATENT DOCUMENTS

| | | |
|---|---|---|
| JP | 3793433 | 7/2006 |
| JP | 2016-512886 | 5/2016 |
| WO | 2007/052471 | 5/2007 |

CHIP AND FLUID-MERGING METHOD

TECHNICAL FIELD

The present invention relates to a chip used for tests or analyses and a fluid-merging method using the chip.

BACKGROUND ART

Conventionally, tests and analyses such as blood tests and genetic tests have been attempted by controlling the liquid delivery and reactions of various specimens or samples by using chips provided with a flow path through which a fluid is delivered. Such chips may be provided with a flow path structure that allows a plurality of fluids to merge and mix.

Patent Document 1 below discloses a chip in which a plurality of micro flow paths are connected to a merging portion. In Patent Document 1, the inner surfaces of the micro flow paths are surface-treated in front of the merging portion in order to align the timing of delivering a microfluid from the plurality of micro flow paths to the merging portion.

RELATED ART DOCUMENT

Patent Document

Patent Document 1: JP 3793433 B2

SUMMARY OF THE INVENTION

Problems to be Solved by the Invention

In the chip described in Patent Document 1, the timing of arrival at the merging portion matches by application of surface treatment to the plurality of flow paths. However, it is difficult to match the timing accurately. If this timing is slightly off, air bubbles can be entrained. If air bubbles are entrained, the timing of liquid delivery, diffusion and mixing between a plurality of fluids, and furthermore reactions generated by merging and the like can be adversely affected.

Further, when merging a plurality of fluids, a liquid delivery pump is required to control the discharge amount with high accuracy. However, in order to control the discharge amount with high accuracy, a large-scale device is required, and there is a problem that a reduction in size is difficult. Further, there is a problem that the manufacturing cost becomes high.

An object of the present invention is to provide a chip that does not require a high-accuracy discharge amount control for a liquid delivery pump and can suppress the entrainment of air bubbles, and a fluid-merging method using the chip.

Means for Solving the Problems

A chip according to the present invention is a chip for test or analysis provided with a flow path through which a fluid is delivered, the chip including: a first flow path through which a first fluid is delivered; a second flow path through which a second fluid is delivered; a merging portion configured to be provided on a downstream end portion side of the first flow path and merge the first fluid and the second fluid; a first connection flow path configured to connect the first flow path and the second flow path at the merging portion and have a liquid delivery resistance higher than a liquid delivery resistance of the first flow path; a degassing flow path configured to be connected to the second flow path on a downstream side of the first connection flow path; a third flow path configured to be provided on a downstream side of the merging portion; and a second connection flow path configured to connect the first flow path and the third flow path and have a liquid delivery resistance higher than the liquid delivery resistance of the first flow path.

In a specific aspect of the chip according to the present invention, the chip further includes a first branch flow path configured to branch at a downstream end portion of the second flow path, in which the degassing flow path is contiguous with the first branch flow path.

In another specific aspect of the chip according to the present invention, the liquid delivery resistance of the first connection flow path is higher than the liquid delivery resistance of the second connection flow path.

In yet another specific aspect of the chip according to the present invention, the chip further includes a second branch flow path configured to branch at a downstream end portion of the first flow path, in which the first connection flow path is connected to the second branch flow path.

In yet another specific aspect of the chip according to the present invention, the liquid delivery resistance of the second connection flow path is higher than the liquid delivery resistance of the first connection flow path.

In yet another specific aspect of the chip according to the present invention, the chip further includes a third connection flow path configured to connect the first flow path and the second flow path on an upstream side of a connection position of the first flow path with the first connection flow path and have a liquid delivery resistance higher than the liquid delivery resistance of the first flow path.

In yet another specific aspect of the chip according to the present invention, the liquid delivery resistance of the third connection flow path is higher than the liquid delivery resistances of the first connection flow path and the second connection flow path.

In yet another specific aspect of the chip according to the present invention, the chip further includes: a third branch flow path configured to branch from the first flow path on an upstream side of a connection position of the first flow path with the first connection flow path; and a fourth connection flow path configured to connect the third branch flow path and the first branch flow path and have a liquid delivery resistance higher than a liquid delivery resistance of the first branch flow path.

In yet another specific aspect of the chip according to the present invention, the liquid delivery resistance of the fourth connection flow path is higher than the liquid delivery resistances of the first connection flow path and the second connection flow path.

In yet another specific aspect of the chip according to the present invention, when a portion where the first flow path branches to the third branch flow path is a branch portion, a downstream side of the branch portion of the first flow path is a weighing portion, and the third branch flow path is a waste liquid flow path.

In yet another specific aspect of the chip according to the present invention, the liquid delivery resistance in each connection flow path is given by a flow path constriction.

A fluid-merging method according to the present invention is a fluid-merging method using the chip configured according to the present invention, the method including: a step of delivering the first fluid from the first flow path to the merging portion and stopping the first fluid at the merging portion; and a step of delivering the second fluid from the second flow path to the merging portion and merging the first fluid and the second fluid.

Effect of the Invention

According to the present invention, it is possible to provide a chip that does not require a high-accuracy discharge amount control for a liquid delivery pump and can suppress the entrainment of air bubbles, and a fluid-merging method using the chip.

MODE(S) FOR CARRYING OUT THE INVENTION

The present invention will be clarified below by describing specific embodiments of the present invention with reference to the drawings.

First Embodiment

Figure 1:
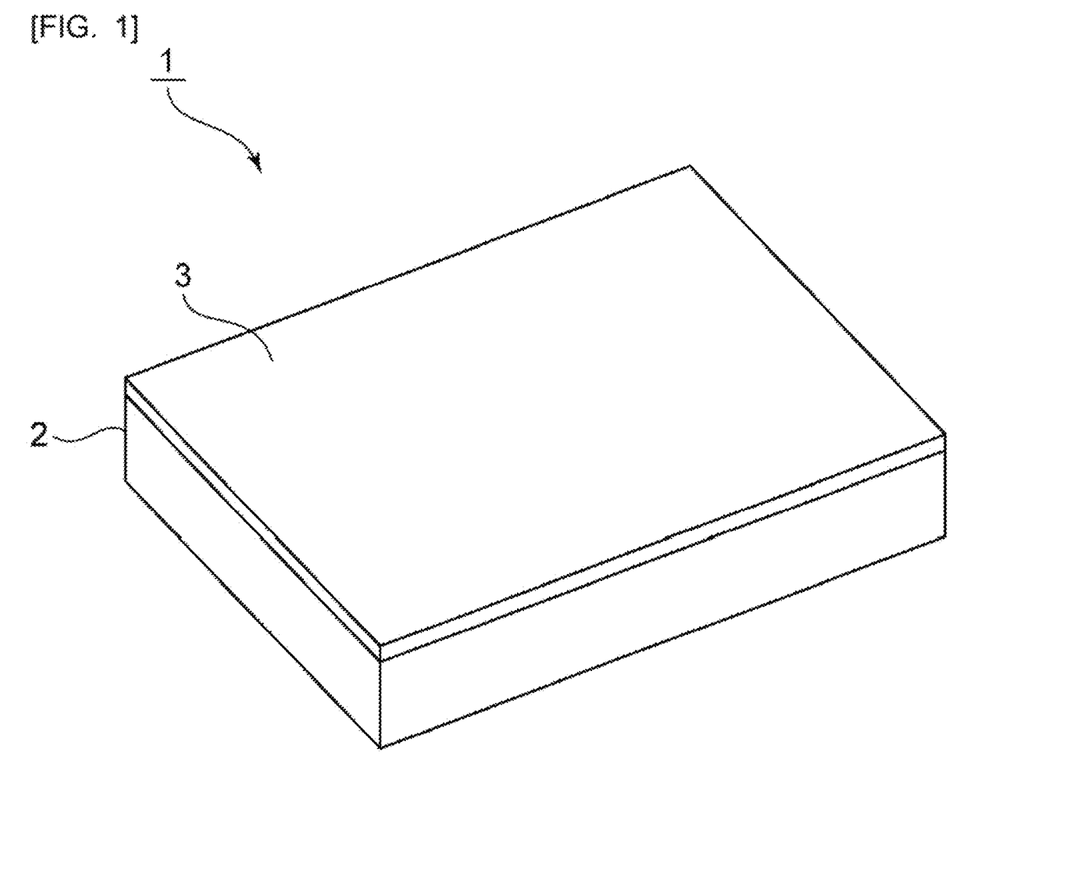
FIG. 1 is a perspective view showing the appearance of a chip according to a first embodiment of the present invention.

FIG. 1 is a perspective view showing the appearance of a chip according to a first embodiment of the present invention.

A chip 1 is a chip for tests or analyses. In the present embodiment, the chip 1 has a rectangular plate-like shape. However, the shape of the chip 1 is not particularly limited.

In the present embodiment, the chip 1 includes a substrate 2 and a cover member 3 provided on the substrate 2. The substrate 2 is made of an injection-molded product of synthetic resin. The cover member 3 is made of an elastomer or synthetic resin. However, the substrate 2 and the cover member 3 may be formed of other materials. Further, the chip 1 may be formed by stacking a plurality of synthetic resin sheets, and the structure thereof is not particularly limited.

A flow path through which a fluid is delivered is provided inside the chip 1. As the fluid, a liquid reagent or the like can be used. The fluid may be a microfluid. Further, here, the flow path is a micro flow path. The flow path may not be a micro flow path but may be a flow path having a larger cross-sectional area than the micro flow path. However, a micro flow path is preferable. Thus, various tests and analyses can be performed with a small amount of sample.

Incidentally, the micro flow path means a fine flow path that causes a micro effect when the fluid is conveyed. In such a micro flow path, the fluid is strongly influenced by the surface tension, and exhibits a behavior different from that of a fluid flowing in a normal large-sized flow path.

The cross-sectional shape and size of the micro flow path are not particularly limited as long as the flow path generates the above-described micro effect. For example, when a pump or gravity is used to flow a fluid through a micro flow path, from the viewpoint of reducing the liquid delivery resistance, when the cross-sectional shape of the micro flow path is generally rectangular (including square), the size of a smaller side is preferably 20 μm or more, more preferably 50 μm or more, and further preferably 100 μm or more. From the viewpoint of a further reduction in size of a microfluidic device using the chip 1, the size of a smaller side is preferably 5 mm or less, more preferably 1 mm or less, further preferably 500 μm or less.

Further, when the cross-sectional shape of the micro flow path is generally circular, the diameter (minor axis in the case of an ellipse) is preferably 20 μm or more, more preferably 50 μm or more, and further preferably 100 μm or more. From the viewpoint of a further reduction in size of a microfluidic device, the diameter (minor axis in the case of an ellipse) is preferably 5 mm or less, more preferably 1 mm or less, further preferably 500 μm or less.

On the other hand, for example, when the capillary phenomenon is effectively utilized to flow a fluid through a micro flow path, when the cross-sectional shape of the micro flow path is generally rectangular (including square), the size of a smaller side is preferably 5 μm or more, more preferably 10 μm or more, and further preferably 20 μm or more. Further, the size of a smaller side is preferably 200 μm or less, further preferably 100 μm or less.

Figure 2:
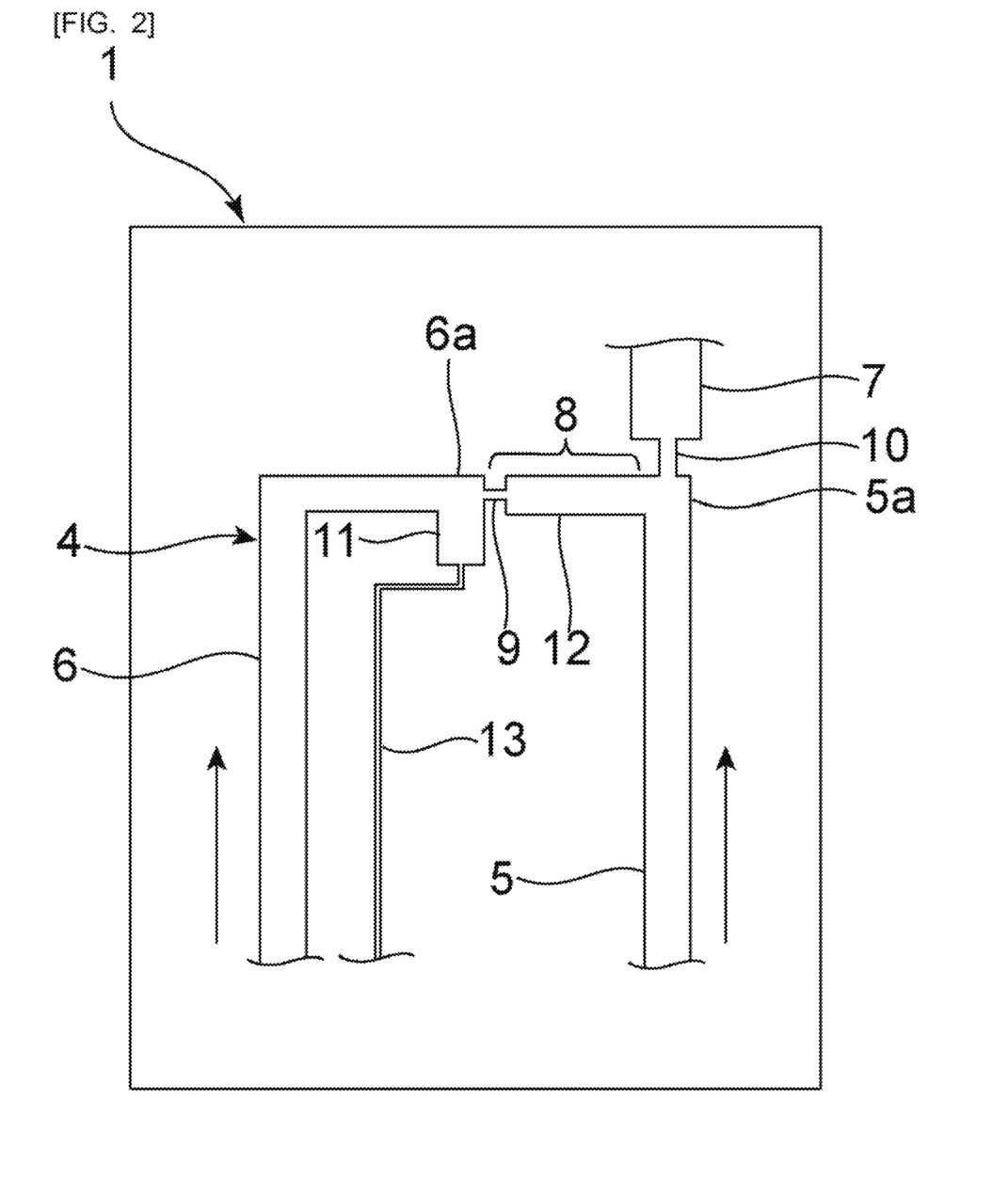
FIG. 2 is a schematic plan view for explaining a flow path structure of the chip according to the first embodiment of the present invention.

In the present embodiment, a flow path structure like a flow path 4 shown in FIG. 2 is configured in the chip 1.

As shown in FIG. 2, the flow path 4 includes a first flow path 5, a second flow path 6, a third flow path 7, a merging portion 8, a first connection flow path 9, a second connection flow path 10, a first branch flow path 11, a second branch flow path 12, and a degassing flow path 13.

The first flow path 5 and the second flow path 6 are flow paths through which a first fluid and a second fluid are delivered, respectively. The first fluid and the second fluid are both liquids. The first fluid and the second fluid may both be microfluids. In the present embodiment, the first flow path 5 is a main flow path, and the second flow path 6 is a recovery liquid flow path. However, the usages of the first flow path 5 and the second flow path 6 are not particularly limited.

The merging portion 8 is provided on a downstream end portion 5a side of the first flow path 5. The merging portion 8 is a portion where the first fluid and the second fluid are merged.

More specifically, in the present embodiment, the downstream end portion 5a of the first flow path 5 is branched into the second branch flow path 12. The first connection flow path 9 is contiguous with the second branch flow path 12. Thus, the merging portion 8 is configured.

The first connection flow path 9 is a flow path connecting the first flow path 5 and the second flow path 6. The liquid delivery resistance is higher in the first connection flow path 9 than in the first flow path 5. In the present embodiment, the liquid delivery resistance is given by a flow path constriction. For that, the cross-sectional area of the first connection flow path 9 is smaller than the cross-sectional area of the first flow path 5. The ratio of the cross-sectional area of the first connection flow path 9 to the cross-sectional area of the first flow path 5 (first connection flow path 9/first flow path 5) can be, for example, 0.01 or more and 0.8 or less. The ratio of the cross-sectional area of the first connection flow path 9 to the cross-sectional area of the first flow path 5 (first connection flow path 9/first flow path 5) is preferably 0.1 or more and 0.6 or less.

The first connection flow path 9 is connected to a downstream end portion 6a of the second flow path 6. The downstream end portion 6a of the second flow path 6 is branched into the first branch flow path 11. The degassing flow path 13 is contiguous with the first branch flow path 11. The degassing flow path 13 is a flow path through which a liquid cannot pass but a gas can pass. The degassing flow path 13 is connected to the outside of the chip 1. In the degassing flow path 13, the cross-sectional area of the flow path is extremely small. The ratio of the cross-sectional area of the degassing flow path 13 to the cross-sectional area of the first branch flow path 11 (degassing flow path 13/first branch flow path 11) can be, for example, 0.01 or more and 0.8 or less. The ratio of the cross-sectional area of the degassing flow path 13 to the cross-sectional area of the first branch flow path 11 (degassing flow path 13/first branch flow path 11) is preferably 0.01 or more and 0.4 or less, more preferably 0.01 or more and 0.1 or less.

The third flow path 7 is provided further downstream of the merging portion 8. The first flow path 5 and the third flow path 7 are connected by the second connection flow path 10. The liquid delivery resistance is higher in the second connection flow path 10 than in the first flow path 5. In the present embodiment, the liquid delivery resistance is given by a flow path constriction. For that, the cross-sectional area of the second connection flow path 10 is smaller than the cross-sectional area of the first flow path 5. The ratio of the cross-sectional area of the second connection flow path 10 to the cross-sectional area of the first flow path 5 (second connection flow path 10/first flow path 5) can be, for example, 0.01 or more and 0.8 or less. The ratio of the cross-sectional area of the second connection flow path 10 to the cross-sectional area of the first flow path 5 (second connection flow path 10/first flow path 5) is preferably 0.2 or more and 0.8 or less.

Further, in the present embodiment, the liquid delivery resistance of the first connection flow path 9 is higher than the liquid delivery resistance of the second connection flow path 10. For that, the cross-sectional area of the first connection flow path 9 is smaller than the cross-sectional area of the second connection flow path 10. The ratio of the cross-sectional area of the first connection flow path 9 to the cross-sectional area of the second connection flow path 10 (first connection flow path 9/second connection flow path 10) can be, for example, 0.01 or more and 0.8 or less. The ratio of the cross-sectional area of the first connection flow path 9 to the cross-sectional area of the second connection flow path 10 (first connection flow path 9/second connection flow path 10) is preferably 0.1 or more and 0.8 or less. However, in the present invention, the liquid delivery resistance of the second connection flow path 10 may be higher than or the same as the liquid delivery resistance of the first connection flow path 9. The relationship between the liquid delivery resistances of the first connection flow path 9 and the second connection flow path 10 can be appropriately determined by the flow path structure of the flow path 4.

The chip 1 of the present embodiment, which has the above-mentioned flow path structure, does not require the high-accuracy discharge amount control for a liquid delivery pump and can suppress the entrainment of air bubbles. This point can be described by the specific merging method shown below.

Figure 3:
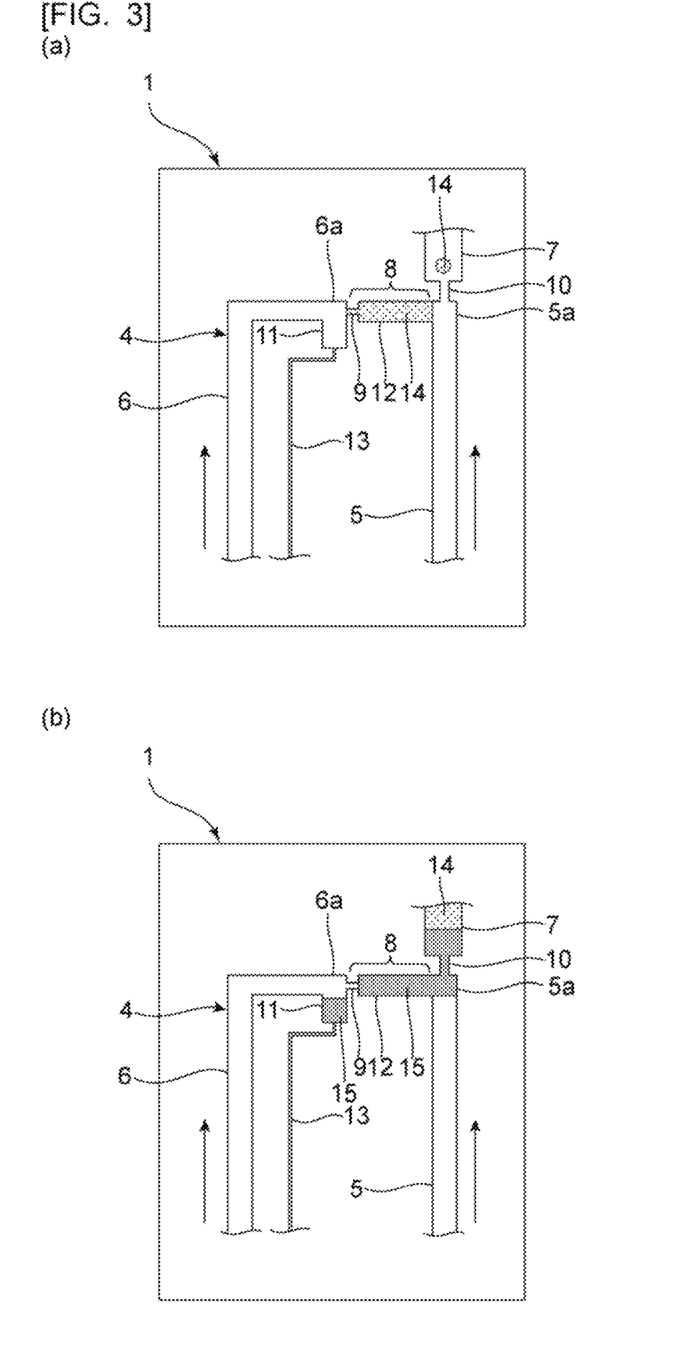
FIGS. 3(a) and 3(b) are schematic plan views for explaining a fluid-merging method using the chip according to the first embodiment of the present invention.

FIGS. 3(a) and 3(b) are schematic plan views for explaining a fluid-merging method using the chip according to the first embodiment of the present invention.

In the fluid-merging method according to the present embodiment, as shown in FIG. 3(a), first, a first fluid 14 is delivered from the first flow path 5 to the merging portion 8. This liquid delivery is preferably carried out by applying gas from behind the first fluid 14. A liquid delivery pump (micropump) that generates such gas is coupled to the first flow path 5. The micropump may be provided inside the chip 1 as in the present embodiment or may be provided outside the chip 1.

Further, as another liquid delivery means, a gas generating member disposed in a space coupled to the upstream side of the first flow path 5 can be mentioned. The gas generating member is a member that generates gas by an external force such as light or heat. By applying an external force to the gas generating member at a predetermined timing, a gas can be generated and the gas can be sent to the first flow path 5. Thus, the first fluid 14 can be delivered from the first flow path 5 to the merging portion 8. Examples of the gas generating member include a gas generating tape. Note that as the liquid delivery means, other appropriate means may be used as long as the liquid can be delivered from the first flow path 5 to the merging portion 8.

Next, a second fluid 15 is delivered from the second flow path 6 to the merging portion 8. The method for delivering the second fluid 15 is not particularly limited. Preferably, as in the case of the first fluid 14, a method of sending the gas from the liquid delivery pump can be mentioned. In that case, the cost can be further reduced by using the same liquid delivery means for the first fluid 14 and the second fluid 15. Note that since the first fluid 14 is stopped in the merging portion 8, when the second fluid 15 is delivered to the merging portion 8, air bubbles are hardly trapped at the stage where the two fluids come into contact with each other.

Next, as shown in FIG. 3(b), the first fluid 14 and the second fluid 15 can be discharged and recovered from the third flow path 7 by further supplying the gas from at least one of the first flow path 5 and the second flow path 6. Note that the first fluid 14 and the second fluid 15 may be mixed in the third flow path 7 or further downstream. Further, a reaction such as PCR may be carried out in the third flow path 7 or further downstream.

In the chip 1 of the present embodiment, as described above, the first fluid 14 is first stopped in the merging portion 8, and then the second fluid 15 is delivered to the merging portion 8 so as to be caused to contact the first fluid 14. Therefore, it is not necessary to accurately match the timing of delivery of the first fluid 14 and the second fluid 15. Thus, it is possible to reduce the size without requiring a large-scale device having a complicated liquid delivery control mechanism.

Further, since the first fluid 14 is stopped, air bubbles are hardly entrained at the time of merging. In addition, the downstream end portion 6a of the second flow path 6 connected to the merging portion 8 where the first fluid 14 is stopped is connected to the degassing flow path 13 via the first branch flow path 11. Thus, the air between the first fluid 14 and the second fluid 15 can be released through the degassing flow path 13. Therefore, especially from this point as well, it is possible to unfailingly suppress the entrainment of air bubbles at the time of merging.

Further, in the present embodiment, as shown in FIG. 3(a), even when the pump continues to operate after the first fluid 14 is stopped at the merging portion 8, the gas can be released from the second connection flow path 10, and therefore the first fluid 14 can be retained at the merging portion 8. Further, since the liquid delivery resistance of the first connection flow path 9 is higher than the liquid delivery resistance of the second connection flow path 10, even when the first fluid 14 is excessively delivered, it is pushed out to the third flow path 7 side as shown in FIG. 3(a). Thus, the first fluid 14 can be retained at the merging portion 8. Therefore, even when the liquid delivery pump having a low discharge amount accuracy is used, the first fluid 14 and the second fluid 15 can be merged unfailingly. Note that the first fluid 14 pushed out to the third flow path 7 side can also be merged in a subsequent process.

From the above, the merging method using the chip 1 does not require high-accuracy discharge amount control for a liquid delivery pump and can suppress the entrainment of air bubbles. Further, since high-accuracy discharge amount control is not required, it is possible to reduce the size and the manufacturing cost of the chip 1.

Second Embodiment

Figure 4:
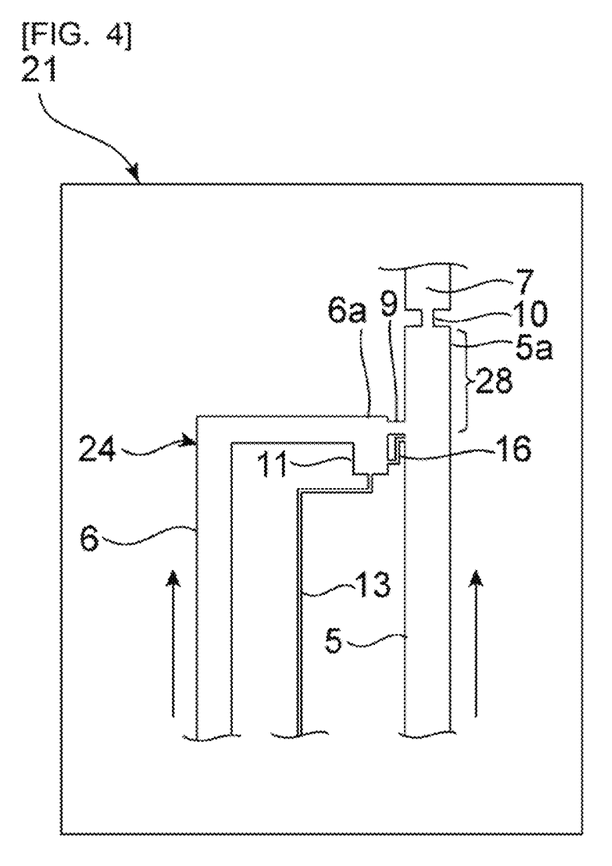
FIG. 4 is a schematic plan view for explaining a flow path structure of a chip according to a second embodiment of the present invention.

FIG. 4 is a schematic plan view for explaining a flow path structure of a chip according to a second embodiment of the present invention.

In a chip 21 of the second embodiment, a flow path structure such as a flow path 24 is configured.

As shown in FIG. 4, in the chip 21, the first connection flow path 9 is directly connected to the first flow path 5 on an upstream side of a connection position of the downstream end portion 5a of the first flow path 5 with the second connection flow path 10. Thus, a merging portion 28 is configured. Therefore, the chip 21 is not provided with the second branch flow path 12.

Further, in the chip 21, the liquid delivery resistance of the second connection flow path 10 is higher than the liquid delivery resistance of the first connection flow path 9. For that, the cross-sectional area of the second connection flow path 10 is smaller than the cross-sectional area of the first connection flow path 9. The ratio of the cross-sectional area of the second connection flow path 10 to the cross-sectional area of the first connection flow path 9 (second connection flow path 10/first connection flow path 9) can be, for example, 0.01 or more and 0.8 or less. The ratio of the cross-sectional area of the second connection flow path 10 to the cross-sectional area of the first connection flow path 9 (second connection flow path 10/first connection flow path 9) is preferably 0.1 or more and 0.8 or less. In the present embodiment, the liquid delivery resistance of the second connection flow path 10 is desirably higher than the liquid delivery resistance of the first connection flow path 9, but may be the same or smaller than the liquid delivery resistance of the first connection flow path 9.

Further, in the chip 21, the portion of the first flow path 5 on an upstream side of the connection position with the first connection flow path 9 is connected to the first branch flow path 11 by a third connection flow path 16. The liquid delivery resistance is also higher in the third connection flow path 16 than in the first flow path 5. The liquid delivery resistance is also given by a flow path constriction in the third connection flow path 16. For that, the cross-sectional area of the third connection flow path 16 is smaller than the cross-sectional area of the first flow path 5. The ratio of the cross-sectional area of the third connection flow path 16 to the cross-sectional area of the first flow path 5 (third connection flow path 16/first flow path 5) can be, for example, 0.01 or more and 0.8 or less. The ratio of the cross-sectional area of the third connection flow path 16 to the cross-sectional area of the first flow path 5 (third connection flow path 16/first flow path 5) is preferably 0.01 or more and 0.4 or less.

Further, the liquid delivery resistance of the third connection flow path 16 is higher than the liquid delivery resistances of the first connection flow path 9 and the second connection flow path 10. For that, the cross-sectional area of the third connection flow path 16 is smaller than the cross-sectional areas of the first connection flow path 9 and the second connection flow path 10. The ratio of the cross-sectional area of the third connection flow path 16 to the cross-sectional area of the first connection flow path 9 (third connection flow path 16/first connection flow path 9) can be, for example, 0.01 or more and 0.8 or less. The ratio of the cross-sectional area of the third connection flow path 16 to the cross-sectional area of the first connection flow path 9 (third connection flow path 16/first connection flow path 9) is preferably 0.01 or more and 0.4 or less.

Other points are the same as those in the first embodiment.

The chip 21 of the present embodiment, which has the above-mentioned flow path structure, does not require the high-accuracy discharge amount control for a liquid delivery pump and can suppress the entrainment of air bubbles. This point can be described by the specific merging method shown below.

FIGS. 5(a) and 5(b) are schematic plan views for explaining a fluid-merging method using the chip according to the second embodiment of the present invention.

Similarly, in the fluid-merging method according to the present embodiment, as shown in FIG. 5(a), first, the first fluid 14 is delivered from the first flow path 5 to the merging portion 28. This liquid delivery is preferably carried out by applying gas from behind the first fluid 14. A liquid delivery pump (micropump) that generates such gas is coupled to the first flow path 5.

Next, the second fluid 15 is delivered from the second flow path 6 to the merging portion 28. The method for delivering the second fluid 15 is not particularly limited. Preferably, as in the case of the first fluid 14, a method of sending the gas from the liquid delivery pump can be mentioned. In that case, the cost can be further reduced by using the same liquid delivery means for the first fluid 14 and the second fluid 15. Note that since the first fluid 14 is stopped in the merging portion 28, when the second fluid 15 is delivered to the merging portion 28, air bubbles are hardly trapped at the stage where the two fluids come into contact with each other.

Next, as shown in FIG. 5(b), the first fluid 14 and the second fluid 15 can be discharged and recovered from the third flow path 7 by further supplying the gas from at least one of the first flow path 5 and the second flow path 6. Note that the first fluid 14 and the second fluid 15 may be mixed in the third flow path 7 or further downstream. Further, a reaction such as PCR may be carried out in the third flow path 7 or further downstream.

Similarly, in the merging method of the present embodiment, as described above, the first fluid 14 is first stopped in the merging portion 28, and then the second fluid 15 is delivered to the merging portion 28 so as to be caused to contact the first fluid 14. Therefore, it is not necessary to accurately match the timing of delivery of the first fluid 14 and the second fluid 15. Thus, it is possible to reduce the size without requiring a large-scale device having a complicated liquid delivery control mechanism.

Further, since the first fluid 14 is stopped, air bubbles are hardly trapped at the time of merging. In addition, the downstream end portion 6a of the second flow path 6 connected to the merging portion 28 where the first fluid 14 is stopped is connected to the degassing flow path 13 via the first branch flow path 11. Thus, the air between the first fluid 14 and the second fluid 15 can be released through the degassing flow path 13. Therefore, especially from this point as well, it is possible to unfailingly suppress the entrainment of air bubbles at the time of merging.

Figure 5:
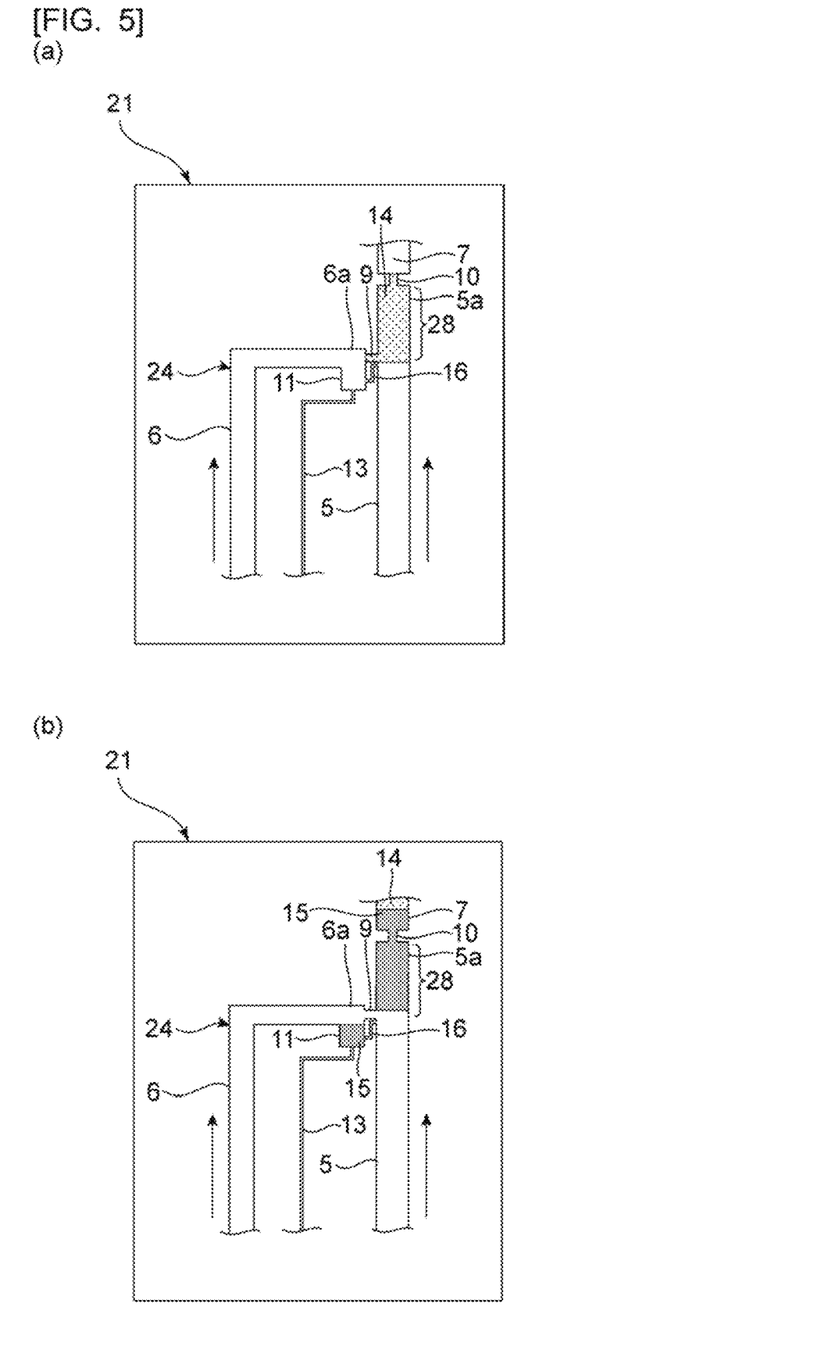
FIGS. 5(a) and 5(b) are schematic plan views for explaining a fluid-merging method using the chip according to the second embodiment of the present invention.

Further, in the present embodiment, as shown in FIG. 5(*b*), even when the pump continues to operate after the first fluid 14 is stopped at the merging portion 28, the gas can be released from the third connection flow path 16, and therefore the first fluid 14 can be retained at the merging portion 28. Therefore, even when the liquid delivery pump having a low discharge amount accuracy is used, the first fluid 14 and the second fluid 15 can be merged unfailingly.

From the above, similarly, the merging method using the chip 21 does not require high-accuracy discharge amount control for a liquid delivery pump and can suppress the entrainment of air bubbles. Further, since high-accuracy discharge amount control is not required, it is possible to reduce the size and the manufacturing cost of the chip 21.

Third Embodiment

Figure 6:
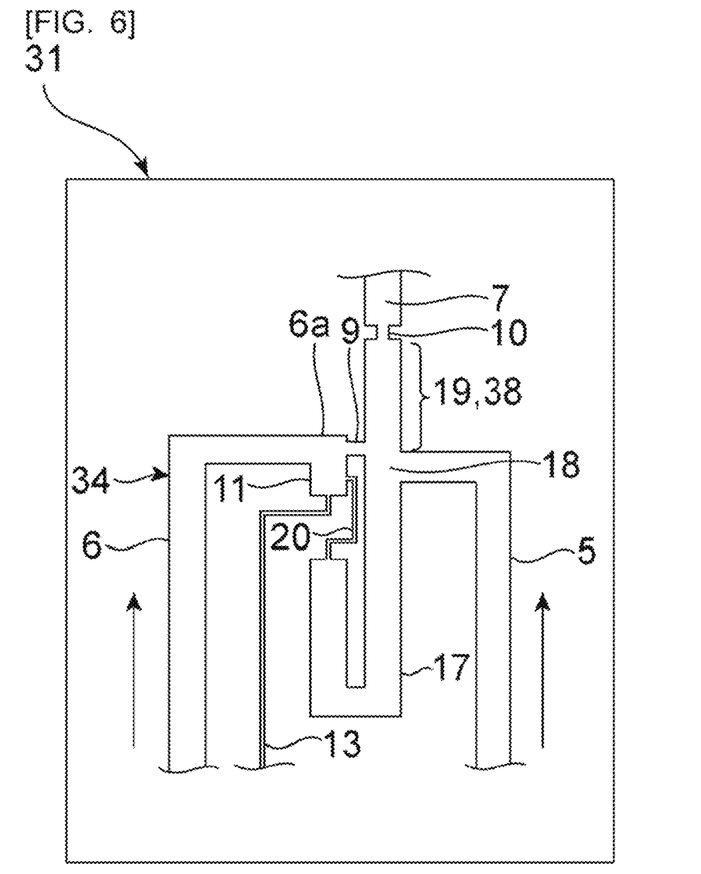
FIG. 6 is a schematic plan view for explaining a flow path structure of a chip according to a third embodiment of the present invention.

FIG. 6 is a schematic plan view for explaining a flow path structure of a chip according to a third embodiment of the present invention.

In a chip 31 of the third embodiment, a flow path structure such as a flow path 34 is configured.

As shown in FIG. 6, in the chip 31, the first connection flow path 9 is directly connected to the first flow path 5 on an upstream side of a connection position of a downstream end portion of the first flow path 5 with the second connection flow path 10. Thus, a merging portion 38 is configured. Therefore, the chip 31 is not provided with the second branch flow path 12.

Further, in the chip 31, the liquid delivery resistance of the second connection flow path 10 is higher than the liquid delivery resistance of the first connection flow path 9. For that, the cross-sectional area of the second connection flow path 10 is smaller than the cross-sectional area of the first connection flow path 9. The ratio of the cross-sectional area of the second connection flow path 10 to the cross-sectional area of the first connection flow path 9 (second connection flow path 10/first connection flow path 9) can be, for example, 0.01 or more and 0.8 or less. The ratio of the cross-sectional area of the second connection flow path 10 to the cross-sectional area of the first connection flow path 9 (second connection flow path 10/first connection flow path 9) is preferably 0.1 or more and 0.8 or less. In the present embodiment, the liquid delivery resistance of the second connection flow path 10 is desirably higher than the liquid delivery resistance of the first connection flow path 9, but may be the same or smaller than the liquid delivery resistance of the first connection flow path 9.

Further, the chip 31 is provided with a third branch flow path 17 branching from the first flow path 5 on an upstream side of the connection position of the first flow path 5 with the first connection flow path 9. In the present embodiment, when the portion where the first flow path 5 branches to the third branch flow path 17 is a branch portion 18, the downstream side of the branch portion 18 of the first flow path 5 is a weighing portion 19. Further, the third branch flow path 17 is a waste liquid flow path. It is desirable that the liquid delivery resistance of the third branch flow path 17 be the same as the liquid delivery resistance of the first flow path 5 or higher than the liquid delivery resistance of the first flow path 5. However, the flow path structure enables an appropriate setting.

Further, the chip 31 is provided with a fourth connection flow path 20 that connects the third branch flow path 17 and the first branch flow path 11. The liquid delivery resistance is higher in the fourth connection flow path 20 than in the third branch flow path 17. The liquid delivery resistance is also given by a flow path constriction in the fourth connection flow path 20. For that, the cross-sectional area of the fourth connection flow path 20 is smaller than the cross-sectional area of the third branch flow path 17. The ratio of the cross-sectional area of the fourth connection flow path 20 to the cross-sectional area of the third branch flow path 17 (fourth connection flow path 20/third branch flow path 17) can be, for example, 0.01 or more and 0.8 or less. The ratio of the cross-sectional area of the fourth connection flow path 20 to the cross-sectional area of the third branch flow path 17 (fourth connection flow path 20/third branch flow path 17) is preferably 0.01 or more and 0.4 or less.

Further, the liquid delivery resistance of the fourth connection flow path 20 is higher than the liquid delivery resistances of the first connection flow path 9 and the second connection flow path 10. For that, the cross-sectional area of the fourth connection flow path 20 is smaller than the cross-sectional areas of the first connection flow path 9 and the second connection flow path 10. The ratio of the cross-sectional area of the fourth connection flow path 20 to the cross-sectional area of the first connection flow path 9 (fourth connection flow path 20/first connection flow path 9) can be, for example, 0.01 or more and 0.8 or less. The ratio of the cross-sectional area of the fourth connection flow path 20 to the cross-sectional area of the first connection flow path 9 (fourth connection flow path 20/first connection flow path 9) is preferably 0.01 or more and 0.7 or less.

Other points are the same as those in the first embodiment.

The chip 31 of the present embodiment, which has the above-mentioned flow path structure, does not require the high-accuracy discharge amount control for a liquid delivery pump and can suppress the entrainment of air bubbles. This point can be described by the specific merging method shown below.

Figure 7:
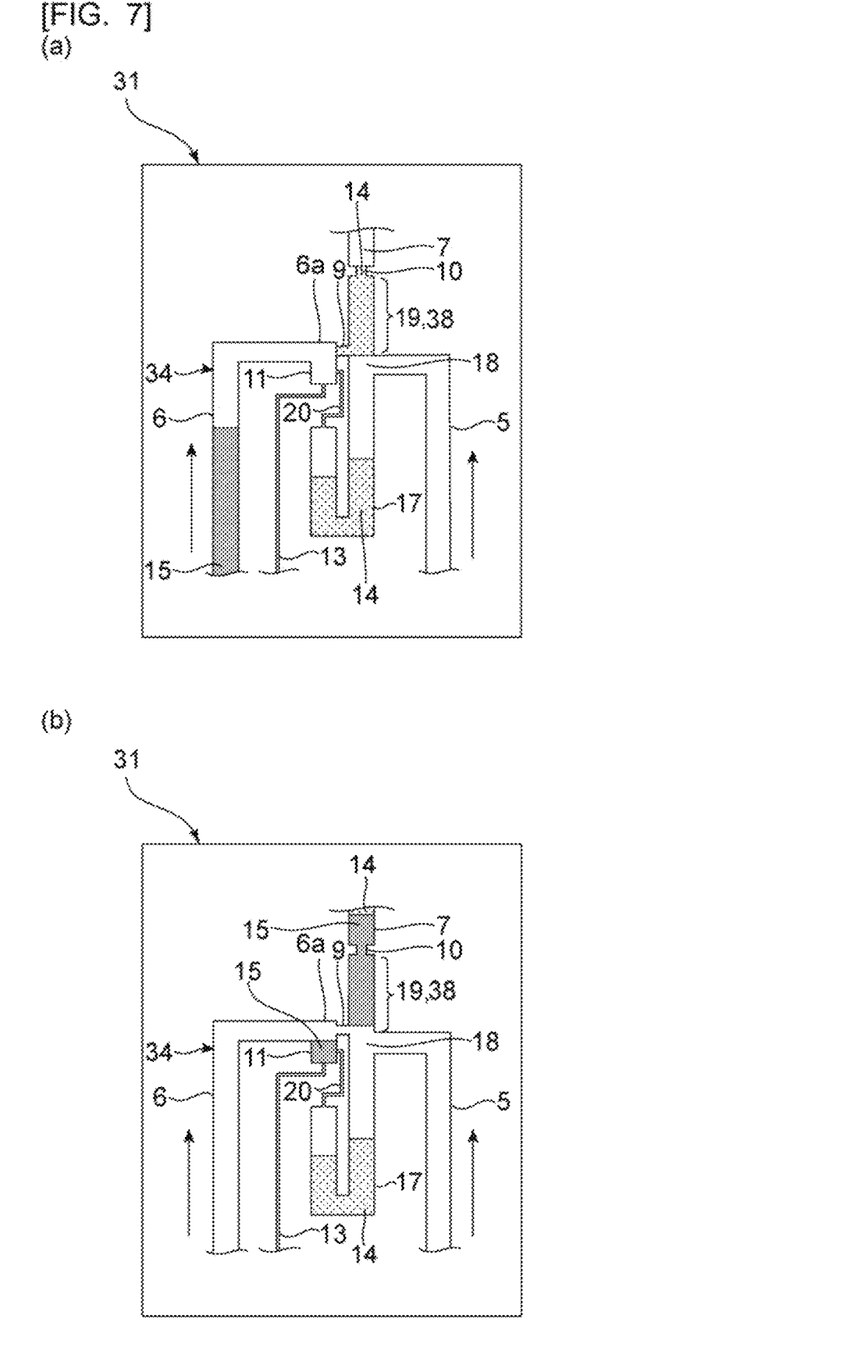
FIGS. 7(a) and 7(b) are schematic plan views for explaining a fluid-merging method using the chip according to the third embodiment of the present invention.

FIGS. 7(*a*) and 7(*b*) are schematic plan views for explaining a fluid-merging method using the chip according to the third embodiment of the present invention.

Similarly, in the fluid-merging method according to the present embodiment, as shown in FIG. 7(*a*), first, the first fluid 14 is delivered from the first flow path 5 to the merging portion 38. This liquid delivery is preferably carried out by applying gas from behind the first fluid 14. A liquid delivery pump (micropump) that generates such gas is coupled to the first flow path 5.

Next, the second fluid 15 is delivered from the second flow path 6 to the merging portion 38. The method for delivering the second fluid 15 is not particularly limited. Preferably, as in the case of the first fluid 14, a method of sending the gas from the liquid delivery pump can be mentioned. In that case, the cost can be further reduced by using the same liquid delivery means for the first fluid 14 and the second fluid 15. Note that since the first fluid 14 is stopped in the merging portion 38, when the second fluid 15 is delivered to the merging portion 38, air bubbles are hardly trapped at the stage where the two fluids come into contact with each other.

Next, as shown in FIG. 7(b), the first fluid 14 and the second fluid 15 can be discharged and recovered from the third flow path 7 by further supplying the gas from at least one of the first flow path 5 and the second flow path 6. Note that the first fluid 14 and the second fluid 15 may be mixed in the third flow path 7 or further downstream. Further, a reaction such as PCR may be carried out in the third flow path 7 or further downstream.

Similarly, in the merging method of the present embodiment, as described above, the first fluid 14 is first stopped in the merging portion 38, and then the second fluid 15 is delivered to the merging portion 38 so as to be caused to contact the first fluid 14. Therefore, it is not necessary to accurately match the timing of delivery of the first fluid 14 and the second fluid 15. Thus, it is possible to reduce the size without requiring a large-scale device having a complicated liquid delivery control mechanism.

Further, since the first fluid 14 is stopped, air bubbles are hardly trapped at the time of merging. In addition, the downstream end portion 6a of the second flow path 6 connected to the merging portion 38 where the first fluid 14 is stopped is connected to the degassing flow path 13 via the first branch flow path 11. Thus, the air between the first fluid 14 and the second fluid 15 can be released through the degassing flow path 13. Therefore, especially from this point as well, it is possible to unfailingly suppress the entrainment of air bubbles at the time of merging.

Further, in the present embodiment, as shown in FIG. 7(b), even when a large amount of the first fluid 14 is delivered, the weighing portion 19 weighs the predetermined first fluid 14 and the rest can be pushed out to the third branch flow path 17 side, which is a waste liquid flow path. Further, even when the pump continues to operate after the first fluid 14 is stopped at the merging portion 38, the gas can be pushed out to the third branch flow path 17, and therefore the first fluid 14 can be retained at the merging portion 38. Therefore, even when the liquid delivery pump having a low discharge amount accuracy is used, the first fluid 14 and the second fluid 15 can be merged unfailingly.

From the above, similarly, the merging method using the chip 31 does not require high-accuracy discharge amount control for a liquid delivery pump and can suppress the entrainment of air bubbles. Further, since high-accuracy discharge amount control is not required, it is possible to reduce the size and the manufacturing cost of the chip 31. Further, the amount of fluid to be delivered can be accurately weighed.

Fourth Embodiment

Figure 8:
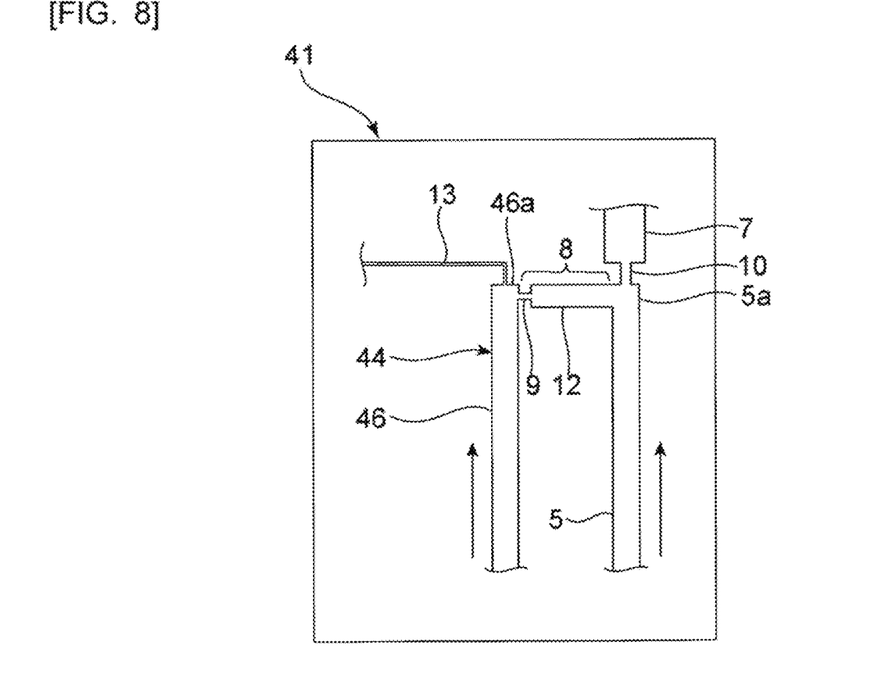
FIG. 8 is a schematic plan view for explaining a flow path structure of a chip according to a fourth embodiment of the present invention.

FIG. 8 is a schematic plan view for explaining a flow path structure of a chip according to a fourth embodiment of the present invention.

In a chip 41 of the fourth embodiment, a flow path structure such as a flow path 44 is configured.

As shown in FIG. 8, in the chip 41, the first connection flow path 9 is connected in the middle of a flow path on the downstream side of a second flow path 46. Further, the degassing flow path 13 is directly connected to a downstream end portion 46a of the second flow path 46. Therefore, the chip 41 is not provided with the first branch flow path 11. Further, in the chip 41, the ratio of the cross-sectional area of the degassing flow path 13 to the cross-sectional area of the second flow path 46 (degassing flow path 13/second flow path 46) can be, for example, 0.01 or more and 0.8 or less. The ratio of the cross-sectional area of the degassing flow path 13 to the cross-sectional area of the second flow path 46 (degassing flow path 13/second flow path 46) is preferably 0.01 or more and 0.4 or less, more preferably 0.01 or more and 0.1 or less.

Other points are the same as those in the first embodiment.

Figure 9:
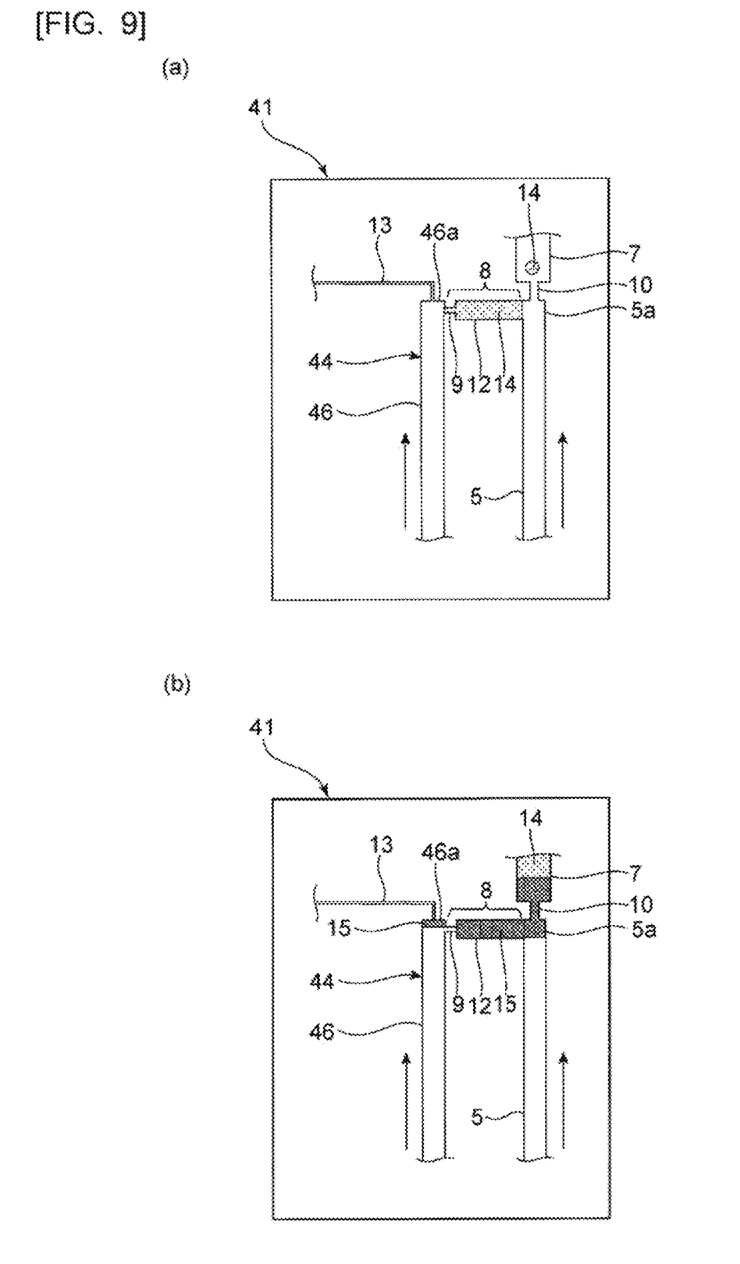
FIGS. 9(a) and 9(b) are schematic plan views for explaining a fluid-merging method using the chip according to the fourth embodiment of the present invention.

FIGS. 9(a) and 9(b) are schematic plan views for explaining a fluid-merging method using the chip according to the fourth embodiment of the present invention.

Similarly, in the fluid-merging method according to the present embodiment, as shown in FIG. 9(a), first, the first fluid 14 is delivered from the first flow path 5 to the merging portion 8. This liquid delivery is preferably carried out by applying gas from behind the first fluid 14. A liquid delivery pump (micropump) that generates such gas is coupled to the first flow path 5.

Next, the second fluid 15 is delivered from the second flow path 46 to the merging portion 8. The method for delivering the second fluid 15 is not particularly limited. Preferably, as in the case of the first fluid 14, a method of sending the gas from the liquid delivery pump can be mentioned. In that case, the cost can be further reduced by using the same liquid delivery means for the first fluid 14 and the second fluid 15. Note that since the first fluid 14 is stopped in the merging portion 8, when the second fluid 15 is delivered to the merging portion 8, air bubbles are hardly trapped at the stage where the two fluids come into contact with each other.

Next, as shown in FIG. 9(b), the first fluid 14 and the second fluid 15 can be discharged and recovered from the third flow path 7 by further supplying the gas from at least one of the first flow path 5 and the second flow path 46. Note that the first fluid 14 and the second fluid 15 may be mixed in the third flow path 7 or further downstream. Further, a reaction such as PCR may be carried out in the third flow path 7 or further downstream.

Similarly, in the merging method of the present embodiment, as described above, the first fluid 14 is first stopped in the merging portion 8, and then the second fluid 15 is delivered to the merging portion 8 so as to be caused to contact the first fluid 14. Therefore, it is not necessary to accurately match the timing of delivery of the first fluid 14 and the second fluid 15. Thus, it is possible to reduce the size without requiring a large-scale device having a complicated liquid delivery control mechanism.

Further, since the first fluid 14 is stopped, air bubbles are hardly entrained at the time of merging. In addition, the degassing flow path 13 is directly connected to the second flow path 46 on the downstream side of the first connection flow path 9 connected to the merging portion 8 where the first fluid 14 is stopped. Thus, the air between the first fluid 14 and the second fluid 15 can be released through the degassing flow path 13. Therefore, especially from this point as well, it is possible to unfailingly suppress the entrainment of air bubbles at the time of merging.

Further, in the present embodiment, as shown in FIG. 9(a), even when the pump continues to operate after the first fluid 14 is stopped at the merging portion 8, the gas can be released from the second connection flow path 10, and therefore the first fluid 14 can be retained at the merging portion 8. Further, since the liquid delivery resistance of the first connection flow path 9 is higher than the liquid delivery resistance of the second connection flow path 10, even when the first fluid 14 is excessively delivered, it is pushed out to the third flow path 7 side as shown in FIG. 9(a). Thus, the first fluid 14 can be retained at the merging portion 8.

Therefore, even when the liquid delivery pump having a low discharge amount accuracy is used, the first fluid 14 and the second fluid 15 can be merged unfailingly. Note that the first fluid 14 pushed out to the third flow path 7 side can also be merged in a subsequent process.

From the above, similarly, the merging method using the chip 41 does not require high-accuracy discharge amount control for a liquid delivery pump and can suppress the entrainment of air bubbles. Further, since high-accuracy discharge amount control is not required, it is possible to reduce the size and the manufacturing cost of the chip 41.

Further, as in the present embodiment, the degassing flow path 13 may be directly connected to the downstream end portion 46a of the second flow path 46. The degassing flow path 13 may be directly or indirectly connected to the second flow path 46 on the downstream side of the first connection flow path 9. However, in the present invention, as in the first embodiment, the downstream end portion 6a of the second flow path 6 is preferably connected to the degassing flow path 13 via the first branch flow path 11. In this case, the entrainment of air bubbles can be further suppressed.

EXPLANATION OF SYMBOLS 1,21,31,41: Chip
2: Substrate
3: Cover member
4,24,34,44: Flow path
5: First flow path
5a,6a,46a: Downstream end portion
6,46: Second flow path
7: Third flow path
8,28,38: Merging portion
9: First connection flow path
10: Second connection flow path
11: First branch flow path
12: Second branch flow path
13: Degassing flow path
14: First fluid
15: Second fluid
16: Third connection flow path
17: Third branch flow path
18: Branch portion
19: Weighing portion
20: Fourth connection flow path

The invention claimed is:

1. A chip for test or analysis provided with a flow path through which a fluid is delivered, the chip comprising:
a first flow path through which a first fluid is delivered;
a second flow path through which a second fluid is delivered;
a merging portion configured to be provided on a downstream end portion side of the first flow path and merge the first fluid and the second fluid;
a first connection flow path configured to connect the first flow path and the second flow path at the merging portion and have a liquid delivery resistance higher than a liquid delivery resistance of the first flow path;
a second branch flow path configured to branch at a downstream end portion of the first flow path;
a degassing flow path configured to be connected to the second flow path on a downstream side of the first connection flow path;
a third flow path configured to be provided on a downstream side of the merging portion;
a second connection flow path configured to connect the first flow path and the third flow path and have a liquid delivery resistance higher than the liquid delivery resistance of the first flow path,
wherein the merging portion is provided with the first connection flow path and the second branch flow path, and
the liquid delivery resistance of the first connection flow path is higher than the liquid delivery resistance of the second connection flow path.

2. The chip according to claim 1, further comprising a first branch flow path configured to branch at a downstream end portion of the second flow path,
wherein the degassing flow path is contiguous with the first branch flow path.

3. A chip for test or analysis provided with a flow path through which a fluid is delivered, the chip comprising:
a first flow path through which a first fluid is delivered;
a second flow path through which a second fluid is delivered;
a merging portion configured to be provided on a downstream end portion side of the first flow path and merge the first fluid and the second fluid;
a first connection flow path configured to connect the first flow path and the second flow path at the merging portion and have a liquid delivery resistance higher than a liquid delivery resistance of the first flow path;
a degassing flow path configured to be connected to the second flow path on a downstream side of the first connection flow path;
a third flow path configured to be provided on a downstream side of the merging portion;
a second connection flow path configured to connect the first flow path and the third flow path and have a liquid delivery resistance higher than the liquid delivery resistance of the first flow path,
wherein the merging portion is provided with the first connection flow path and a downstream end portion of the first flow path, and
the liquid delivery resistance of the second connection flow path is higher than the liquid delivery resistance of the first connection flow path.

4. The chip according to claim 3, further comprising a third connection flow path configured to connect the first flow path and the second flow path on an upstream side of a connection position of the first flow path with the first connection flow path and have a liquid delivery resistance higher than the liquid delivery resistance of the first flow path.

5. The chip according to claim 4, wherein the liquid delivery resistance of the third connection flow path is higher than the liquid delivery resistances of the first connection flow path and the second connection flow path.

6. The chip according to claim 5, further comprising:
a first branch flow path configured to branch at a downstream end portion of the second flow path;
a third branch flow path configured to branch from the first flow path on an upstream side of a connection position of the first flow path with the first connection flow path; and
a fourth connection flow path configured to connect the third branch flow path and the first branch flow path and have a liquid delivery resistance higher than a liquid delivery resistance of the first branch flow path.

7. The chip according to claim 6, wherein the liquid delivery resistance of the fourth connection flow path is higher than the liquid delivery resistances of the first connection flow path and the second connection flow path.

8. The chip according to claim 6, wherein when a portion where the first flow path branches to the third branch flow path is a branch portion, a downstream side of the branch portion of the first flow path is a weighing portion, and the third branch flow path is a waste liquid flow path.

9. The chip according to claim 1, wherein the liquid delivery resistance in each connection flow path is given by a flow path constriction.

10. A fluid-merging method using the chip according to claim 1, the method comprising:
   a step of delivering the first fluid from the first flow path to the merging portion and stopping the first fluid at the merging portion; and
   a step of delivering the second fluid from the second flow path to the merging portion and merging the first fluid and the second fluid.

11. A fluid-merging method using the chip according to claim 3, the method comprising:
   a step of delivering the first fluid from the first flow path to the merging portion and stopping the first fluid at the merging portion; and
   a step of delivering the second fluid from the second flow path to the merging portion and merging the first fluid and the second fluid.

\* \* \* \* \*